Patented Nov. 24, 1931

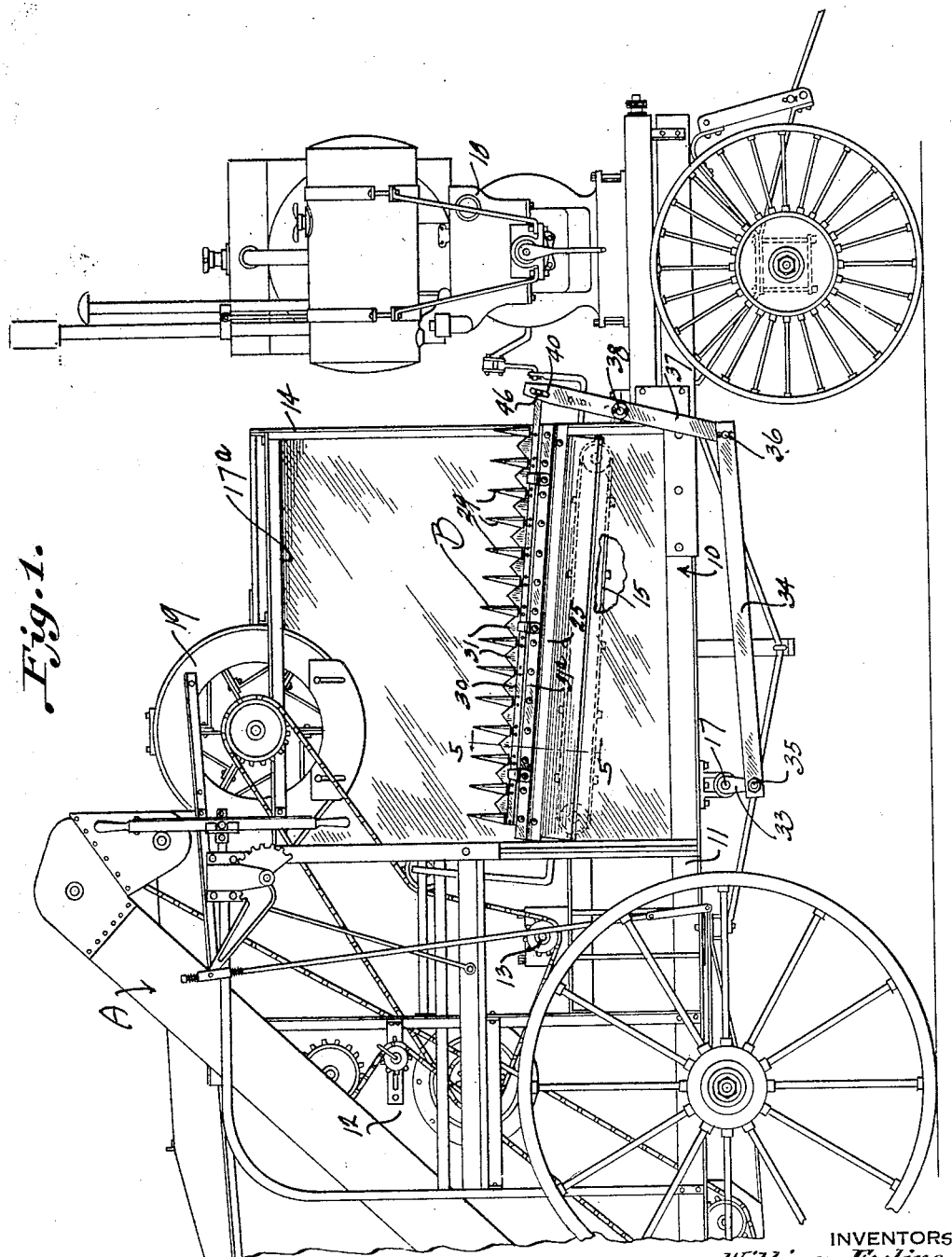

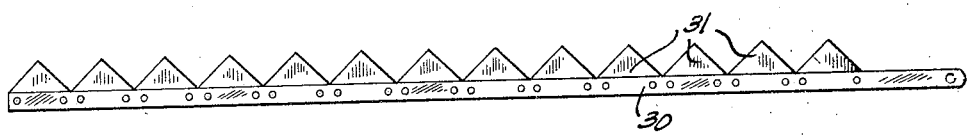
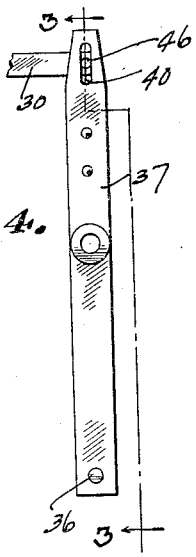
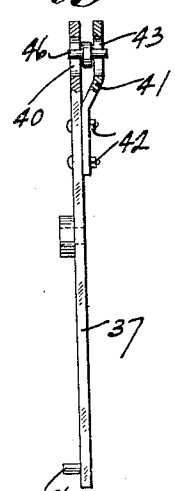
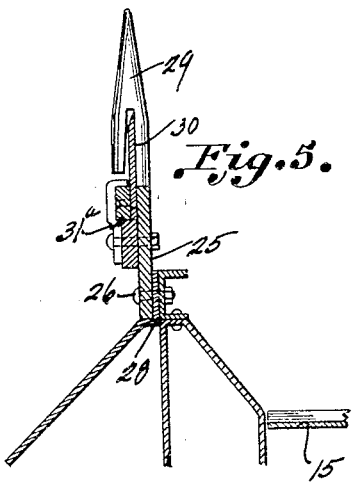
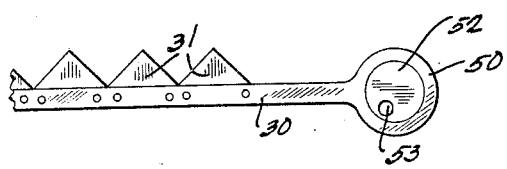
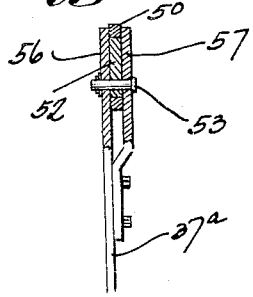

1,833,519

UNITED STATES PATENT OFFICE

WILLIAM EXLINE AND WILLIAM EXLINE, JR., OF KIPP, KANSAS

CUTTING ATTACHMENT FOR THRASHING MACHINES

Application filed December 26, 1923. Serial No. 328,489.

This invention relates to improvements in cutting mechanism for attachment to thrashing machines.

The primary object of this invention is the provision of cutting mechanism operably located upon a thrashing machine across the feed opening to the feeder housing thereof by means of which the heads of grain to be thrashed may be efficiently cut and in a relation to permit the heads to drop upon the feeder belt and be conveyed to the thrashing cylinder.

The improved thrashing machine cutter will find its most effective use in connection with the topping of Kafir corn, maize, and cane crops, and will enable the thrashing machine to be used in the field, and drawn about along a shock row, and the bundles picked up by an operator and dropped with their heads across the cutter in such relation that the seed heads alone are thrashed in an expeditious and efficient relation.

Other objects and advantages of this invention will be apparent during the course of the following detailed description.

In the drawings, wherein for the purpose of illustration is shown a preferred embodiment of the cutter and different ways of operating the same.

Figure 1 is a side view of the improved cutter, showing it in its attached relation across the opening to the feeder house to a thrashing machine.

Figure 2 is an elevation of the sickle or cutter bar.

Figure 3 is a sectional view taken substantially on the line 3—3 of Figure 4.

Figure 4 is a fragmentary elevation showing the driving connection of the operating mechanism with the sickle bar.

Figure 5 is a sectional view taken substantially on the line 5—5 of Figure 1.

Figure 6 is a modified end construction of the sickle bar.

Figure 7 is a sectional view showing the driving connection with the modification of Figure 6.

In the drawings, wherein similar reference characters designate corresponding parts throughout the several views, the letter A may generally designate the thrashing machine, of a conventional type, upon which the improved cutting mechanism B is operatively associated in a novel relation.

Referring to the thrashing machine A, the same comprises the chassis 10, of which the frame 11 is a part, and upon which conventional details of the thrashing machine A are mounted. These details include a thrasher housing 12, wherein a thrashing cylinder (not shown) is mounted, upon a shaft 13. A feeder housing 14 is part of the thrashing machine, positioned intermediate the ends thereof, in the lower part of which an endless belt feeding conveyor 15 is provided. One side of the housing 14 is open at $17^a$, so that the grain to be thrashed may be disposed or thrown into the housing 14 upon the conveyor 15, from whence it is carried to the thrashing cylinder, as is well understood in the art. A feeder drive counter shaft 17 is rotatably supported upon the chassis, having conventional driving connection with the power plant 18 mounted on the fore part of the chassis. Cleaning fan mechanism 19 overhangs the conveyor in approved relation. It is the usual practice to either thrash the whole bundle of such grain, which is not easy or economical, or to cut the seed heads with some kind of a knife and then move the thrashing machine to a stationary location where such heads are disposed, and thrash them. I am also aware that it has been proposed to apply a cutter attachment to the platform of the harvester portion of a harvesting and thrashing machine, but that in such instance the machine or mechanism is stationary, and is not used as a traveling harvester or thrasher. However, with my invention, the cutter bar is operatively mounted across the opening to the feeder housing in such relation that the thrasher is used either while standing stationary, but preferably while traveling along a shock row; the operator picking up the bundles and disposing the heads across the cutter mechanism so as to cut them from the straw, from whence they fall into the traveling thrashing machine. This does away with the necessity of using the platform and reel of the harvesting portion of the machine.

Referring to the cutting attachment B, the same includes the bar 25 which is riveted, bolted, or otherwise secured at 26 to part of the thrashing machine frame, as shown at 28 in Figure 5 of the drawings; the bar 25 extending along the lower part of the opening 17ᵃ to the feeder housing, longitudinally of the side of the conveyor 15 therein. The bar 25 is of usual construction, and includes the bifurcated guard fingers 29 rigid therewith and extending upwardly therefrom. The slidable knife bar 30 is supported by means 31ᵃ upon the bar 25, and it includes a plurality of the usual triangular shaped cutting blades 31 extending upwardly therefrom in an article shearing relation with respect to the guard fingers 29 which receive said blades in the usual manner. It is of course obvious that the knife bar 30 upon longitudinal sliding along the guard bar 25 enables a movement of the blades 31 between the spaced guard fingers 29 to cut the articles which are placed upon the cutter mechanism.

Different means may be devised for moving the knife bar of the cutter mechanism. A preferred construction is that of providing a crank 33 upon the drive shaft 17, at a side of the thrashing machine, to which is pivotally connected at its rear end, a connecting rod 34, as by bolt means 35. The connecting rod 34 extends forwardly along a side of the thrashing machine, and is pivotally connected at 36 to the lower arm of a lever 37, which is pivoted between its ends at 38 upon the chassis frame 10. The lever 37 extends upwardly, and at the upper end of its upper arm it is pivotally connected with the knife bar 30. Different means may be provided for pivotally connecting the lever 37 to the knife bar. A preferred construction is that shown in Figures 1 to 5 of the drawings, which consists in longitudinally slotting the upper end of the lever 37, at 40, and securing at one side of the upper end of the lever, a supporting bracket 41, which may be bolted at 42 or otherwise secured as by welding or being integral with the lever. The bracket 41 extends upwardly in spaced relation with the upper slotted end of the lever, and itself is provided with a slot 43 longitudinally thereof and aligning with the slot 40. The knife bar 30 at its forward end is provided with a pin 46, extending transverse thereto and rigidly shrunk or otherwise secured therein, providing pin extensions at opposite sides of the knife bar, which slidably pivot in the slots 40 and 43, with the knife bar lying in the space between the lever and the bracket 41, as shown in Figure 3. It is apparent that upon rotation of the drive shaft 17, the connecting rod 34 will be oscillated by the crank 33, which in turn will oscillate the lever 37 between its ends and cause a reciprocatory action of the cutting knife 30 upon the guard bar of the cutter mechanism B.

In lieu of the above described connection of the lever to the knife bar, the knife bar 30 may be provided with a ring-shaped rear end 50, shown in Figure 6, wherein an eccentric 52 may be provided, which has an eccentrically disposed pin 53 carried thereon, and transversely extending at opposite sides therefrom. As is shown in Figure 7 of the drawings, the upper end of the lever 37ᵃ may be bifurcated, providing spaced fingers 56 and 57 provided with aligning openings which receive the oppositely extending pin ends of the pin 53, in a pivotal relation, with the eccentric lying between said fingers 56 and 57. The eccentric 52 is of course rotatable in the ring supporting portion 50 and it is apparent that oscillation of the lever 37ᵃ will enable the knife bar to reciprocate with such construction.

Various changes in the shape, size, and arrangement of parts may be made to the form of invention herein shown and described, without departing from the spirit of the invention or the scope of the claim.

We claim:

As an attachment for a thrasher having a feeder housing supported on a frame, a conveyor in the housing, the housing opening laterally of the conveyor, and a drive shaft below and adjacent one end of the said feeder house opening, said attachment comprising a cutting mechanism disposed in a vertical plane and carried by the frame at the lower margin of the feeder house opening, said cutting mechanism including a reciprocable knife bar, a lever pivotally connected intermediate its ends to the thrasher frame at the side of the feeder housing opening opposite to said shaft, and having its upper arm operatively connected to the knife bar to reciprocate same upon oscillation of the lever, a crank connected to the shaft, and a connecting rod extending longitudinally of and below the feeder house opening and operatively connected to said crank and to the lower end of said lever, to oscillate the latter as the shaft revolves.

WM. EXLINE.
WM. EXLINE, JR.